Aug. 9, 1960     H. H. HOFFMAN     2,948,002
SHAPING MACHINE FOR USE IN SHOE MANUFACTURING, ETC.
Filed March 31, 1958     3 Sheets-Sheet 1

INVENTOR
Howard H. Hoffman
BY
ATTORNEYS

Aug. 9, 1960 H. H. HOFFMAN 2,948,002
SHAPING MACHINE FOR USE IN SHOE MANUFACTURING, ETC.
Filed March 31, 1958 3 Sheets-Sheet 2

INVENTOR
Howard H. Hoffman
BY
ATTORNEYS

Aug. 9, 1960    H. H. HOFFMAN    2,948,002
SHAPING MACHINE FOR USE IN SHOE MANUFACTURING, ETC.
Filed March 31, 1958    3 Sheets-Sheet 3

*INVENTOR*
Howard H. Hoffman

BY
ATTORNEYS

United States Patent Office 2,948,002
Patented Aug. 9, 1960

2,948,002

SHAPING MACHINE FOR USE IN SHOE MANUFACTURING, ETC.

Howard H. Hoffman, Nashville, Tenn., assignor to Southern Shoe Machinery Company, Nashville, Tenn., a corporation of Tennessee Filed Mar. 31, 1958, Ser. No. 725,382

12 Claims. (Cl. 12—97)

This invention relates to a machine used in the manufacture of shoes for moulding and shaping such parts of the shoe as the vamp, quarters, backstay, tip and other parts which require irregular shaping.

In machines presently used for crimping or shaping a shoe upper it is frequently the case that the vamp is not properly stretched or shaped. This causes wrinkles to occur. One defect of present machines is that the shape after crimping is lost in fitting the upper. In most types of shaping machines the shaping blade is supposed to move steadily but actually it has a jerky action which results in improper shaping. It is therefore a purpose of the present machine to efficiently shape and mold the shoe vamp or other parts of the shoe being operated upon, with dispatch, and to otherwise economically and efficiently shape the vamp and other shoe parts.

A further object of this invention is the provision of improved clamping means for shoe upper shaping machines used in the manufacture of shoes which produces a firm and proper clamping of the part of the shoe to be shaped, independent of varying thickness of such part, in order that the shaping die or plate can perform its stretching and shaping action without liability of slipping of the shoe part at the locus of clamping at each side of the die.

A further object of this invention is the provision of a shaping machine for use in shoe manufacturing, which is adaptable for the shaping of other articles than shoes and which has an improved sensitively controlled shaping die adapted to stretch the part to be shaped in direct cooperative action with improved multiple type clamps at each side of the die, which holds the article to be shaped in place, in such manner that the die will most effectively perform a proper shaping operation.

A further object of this invention is the provision of an improved clamping means for effectively holding a shoe vamp and upper upon a shaping machine in which the clamping means is initially actuated by spring pressure and thereafter actuated to permit the clamp to seek its own pressure upon the vamp or upper being shaped, and thus enabling efficient shaping to take place independent of variation in thicknesses of the article being shaped.

A further object of this invention is the provision of an improved machine used in the manufacture of shoes for shaping the vamp and upper in which the clamping effect is so associated with the action of the shaping die that increasing of shaping tensioning is directly proportionate to pressure application of the clamping action upon the vamp or upper.

A further object of this invention is the provision of a shaping and molding machine having controlling means used in the shaping parts of a shoe during manufacture, such as the moulding and forming of fitted uppers so they will conform to the last, thus eliminating overpulling and hammering of the leather after lasting.

Other objects and advantages of this invention will be apparent during the course of the following detailed description.

In the accompanying drawings, wherein for the purpose of illustration is shown only a preferred embodiment of the invention.

Figure 1:
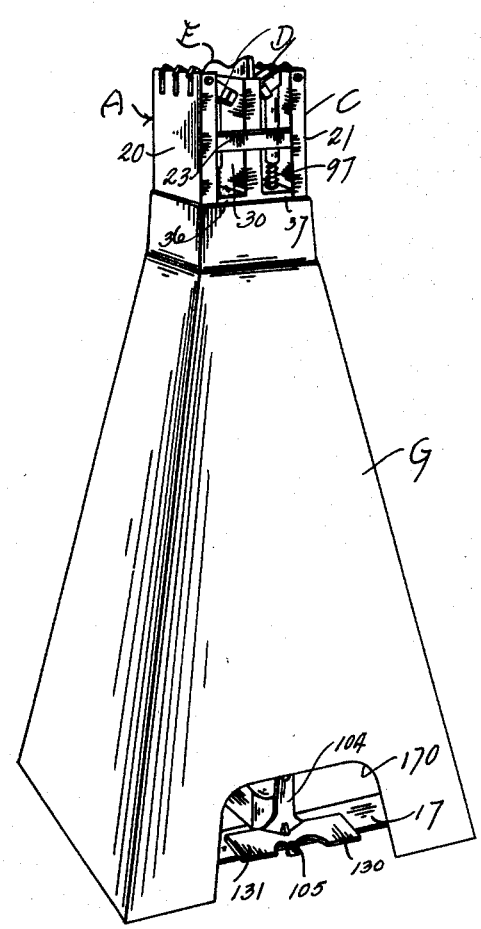
Fig. 1 is a perspective view of the improved shaping machine.
Figure 8:
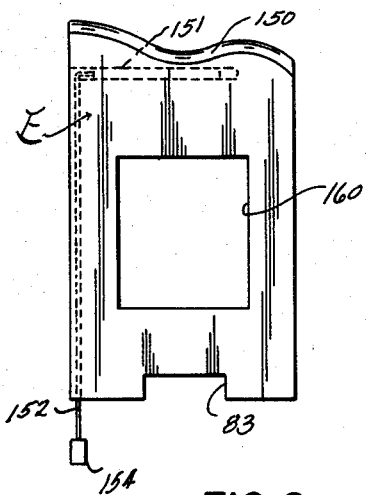
Fig. 8 is a perspective view of the shaping die.

In the drawings wherein similar reference characters designate corresponding parts throughout the several views, the letter A may generally designate the shaping and molding machine for use in the shaping of parts of a shoe during manufacture. The same may include a main supporting frame B, having a frame head C thereon which is preferably detachable for supporting the shaping die and clamping parts of the machine, such as the jaws or clamps D and the shaping die or plate E. Operating means F is provided for actuating the clamps D and the shaping plate E. The framework of the machine may be encased in a removable housing or skirt G if so desired.

The supporting frame B is preferably of structural steel and may include front upright legs or standards 10 and 11, angled in cross section, which viewed from the front slope converge upwardly and are there connected together. Rear standards or legs 12 and 13 also extend upward in relative but inclined convergent relation. The upper ends of the supporting legs or standards 10, 11, 12 and 13, are welded or otherwise connected together by angled pieces 16, which provide a platform for a detachable support of the head C. A base 17 may be welded to the lower ends of the legs 10, 11, 12 and 13, and intermediate their ends their legs 10, 11, 12 and 13, may have welded or otherwise secured thereto horizontal angle braces 18, which also provide means for supporting other details of the invention to be subsequently described.

Figure 5:
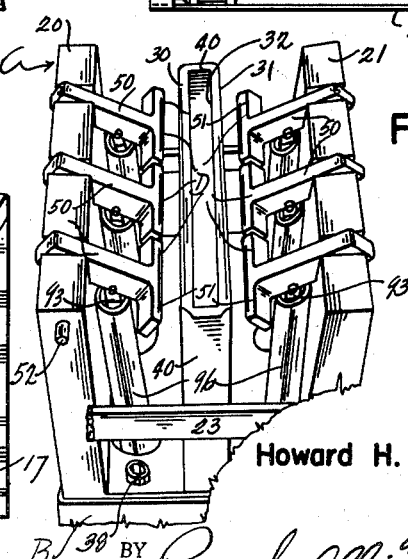
Fig. 5 is a fragmentary perspective view of the shaping and clamping head of the machine, showing the associated details thereof.

The operating head C is adapted to support clamps D and a shaping die or plate E. Preferably head C includes side walls 20 and 21, which are connected (as by welding) in spaced relation by front and rear intermediate horizontal cross bars 23. Die movement guiding walls 30 and 31 are welded or otherwise secured to the bars 23, in relative spaced relation between the walls 20 and 21. They provide a passageway 32 for the vertical sliding of the shaping die or plate E. These walls 30 and 31 are provided with laterally extending base flanges 36 and 37, which are welded to walls 20 and 21 and rest upon the angle plates 16 defining the platform upon which the head C rests. Bases 36 and 37 may receive bolts 38 therethrough for the detachable clamping of the head C upon the platform angle pieces 16. The walls 30 and 31 may be sealed fore and aft by wall portions 40, as shown in Fig. 5. The die plate passageway 32 is opened at its top in order that the die E may extend out of the head C for vamp stretching and shaping purposes.

It will be noted that the outer surfaces of the walls 30 and 31 are appreciably spaced from the inner surfaces of walls 20 and 21.

Figure 6:
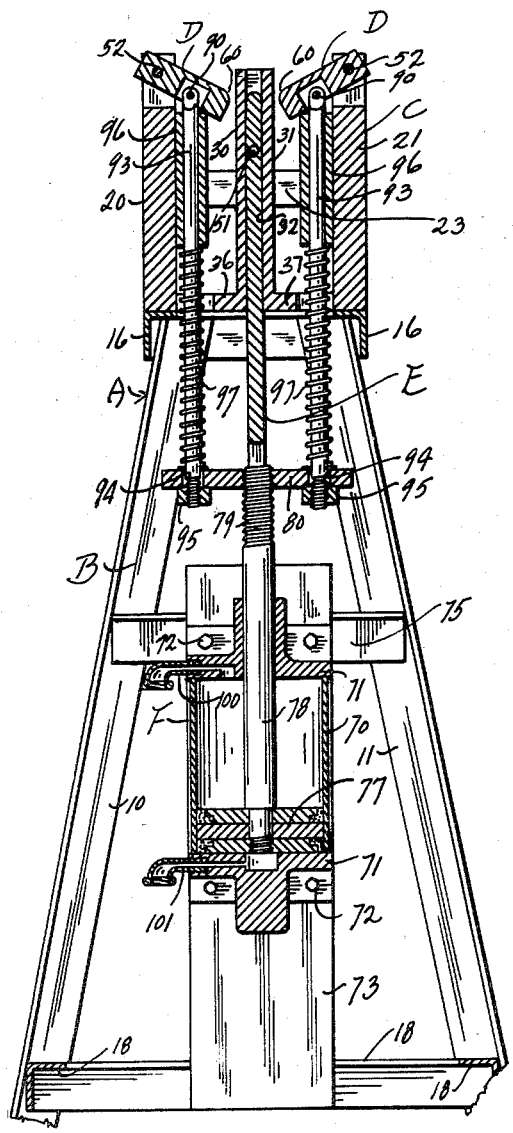
Fig. 6 is a vertical cross sectional view taken through certain details of the improved machine, such as the upper part of the supporting frame thereof, and the shaping head with its clamps associated therewith. It also shows an associated shaping die and clamps and means for actuating the same; this view showing the piston in an in-operative position.
Figure 7:
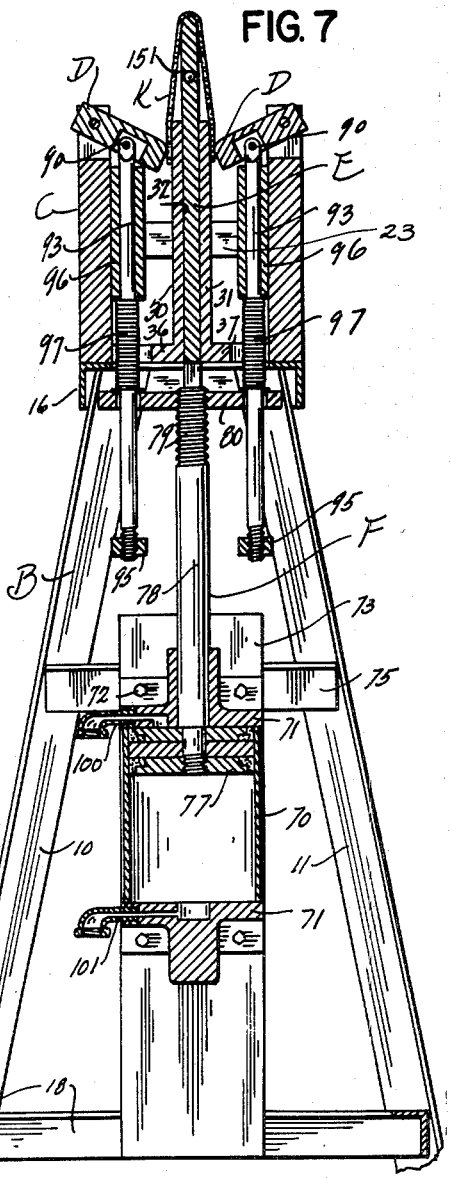
Fig. 7 is a fragmentary cross sectional view of the machine's details shown in Fig. 6, but showing the piston at its up-stroke for actuating the clamps and die shaping member for the holding of a shoe upper or other work in position for the shaping thereof.

The clamps D are of novel formation, and intended to clamp the margins of the vamp or article K being shaped, against the outer surfaces of the die guiding walls 30 and 31, as shown in Fig. 7. There are a plurality of these clamps or jaws D provided at each side of the die E, in order that the operating means F, to be subsequently described may apply pressure to effectively hold and clamp the margins of the article K, being shaped against the frame walls 30 and 31, independent of the number of thicknesses and variation in thickness of the parts making up the article being shaped. It is well known in the shoe manufacturing art that present day uppers including vamps, quarters, backs, tips, toes, etc., and other linings are made of various overlapping marginal thicknesses. In utilizing the plural clamping arrangement of this invention, combined with the independent spring actuating pressure for each clamp; the latter seek their own pressure lines at each side of the die for effectively clamping the article being shaped, throughout the length line of the clamps, in order that the contour or shape of the die may most effectively mold the article K being shaped into the actual shape of the forming face of the die or shaping plate. Each of the clamps D is preferably of T-shaped formation, best shown in Fig. 5, including a bar or stem portion 50 and the clamping plate or bar portion 51, which is adapted to engage the article K in order to clamp it in position upon head C. The stems or bars 50 at their free ends are pivoted upon pivot bars 52, one at each side of the head C; transversely extending through the passageways provided therefor in the upper ends of the walls 20 and 21. These walls 20 and 21 are slotted to receive the pivoted ends of the stem portions 50, and preferably the clamping portions 51 are slightly convexed at their clamping edges as shown at 60 in Fig. 6, of the drawings, so as to prevent damage to the vamp during the clamping action.

Referring to the operating means F, a cylinder 70, having removable heads 71, is preferably bolted at 72, on a vertical axis, upon a panel or wall 73. The latter may be secured to the side brace pieces 18, and at the upper end thereof may have reinforcing angles 75 securing the same to the rear legs 12 and 13. A piston 77 slidably operates in the cylinder 70. It has a piston rod 78 secured thereto, extending upwardly through the top head 71 of the cylinder and at its outer end it is threaded at 79, for detachably receiving a horizontal plate 80. This plate 80 is adapted to receive in resting relation thereon the lower end of the shaping die or plate E. Plate E is recessed at 83 to permit some vertical threaded adjustment of the supporting plate 80 along the piston rod 79. It is intended that the shaping dies should be frequently replaced, because the machine will be utilized for various shaping opertions, according to the styling of the shoe being processed. The die E, extends vertically upward through the passageway 32. Its other characteristics will be subsequently described.

Referring to the operating connections of the clamping members or jaws D, each jaw or clamp D has pivotally connected, at 90, thereto, a depending operating or connecting rod 93, which extends downwardly, rather loosely, through an aperture 94, in the plate 80, and at its lower end below the plate 80, the same is provided with a detachable stop nut 95. Pressure sleeves 96 are slidably mounted upon each of the rods 93, at their upper ends, normally urged upwardly by the compression springs 97 located on the lower portions of the rods 93. Springs 97 rest against the plate 80 or against suitable washers placed upon said plate. The springs 97 are under compression to normally urge the sleeves 96 upwardly and likewise to move the clamps D into engagement with the walls 30 and 31. The springs 97 may be sufficiently relaxed when in in-operative position to leave a space between the clamps D and walls 30 and 31, as shown in Fig. 6, but normally the springs will have sufficient compression that they will initially clamp the margin of the upper to be shaped against the walls 30 and 31, before actuation of the clamp D by means F.

The rods 93 may have a rather loose fit in the sleeves 96, due to the fact that the pivot location 90 swings through a slight arc with the pivot rod 52 as a center, although this is relatively unimportant.

In operation, when the piston 77 is moved upwardly in the cylinder, by power means to be subsequently described, the plate 80 will likewise be upwardly moved vertically. The operator initially places the upper or article K to be shaped over the tops of walls 30 and 31, in U-shaped relation with the sides of the article K inside of the clamps D. As the piston rises the springs 97 will initially be compressed and their force exerted against the sleeves 96 for urging the clamps or jaws D upwardly into firm clamping engagement against the margins of the article K being shaped, as shown in Fig. 7. At the same time elevation of the plate 80 will move the die plate E upwardly for engaging and stretching the upper or member K to be shaped, in the relation shown in Fig. 7. This action of the die E, due to frictional clamping of the upper K under the clamps, will further move the inner ends of the clamps against the article K, and the increase of die pressure against the upper K will proportionately increase the clamping pressure of the clamps D against the sides of the upper K.

Figure 10:
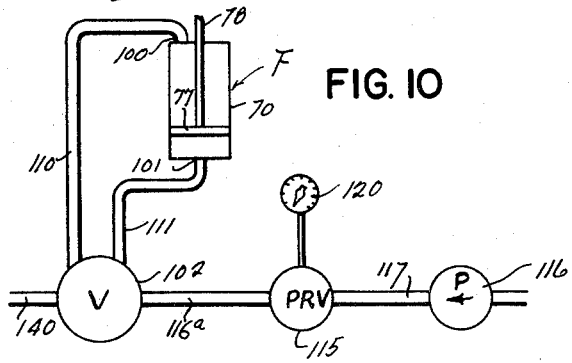
Fig. 10 is a diagrammatic view showing the power applying means for actuating the piston and other details of the machine.
Figure 2:
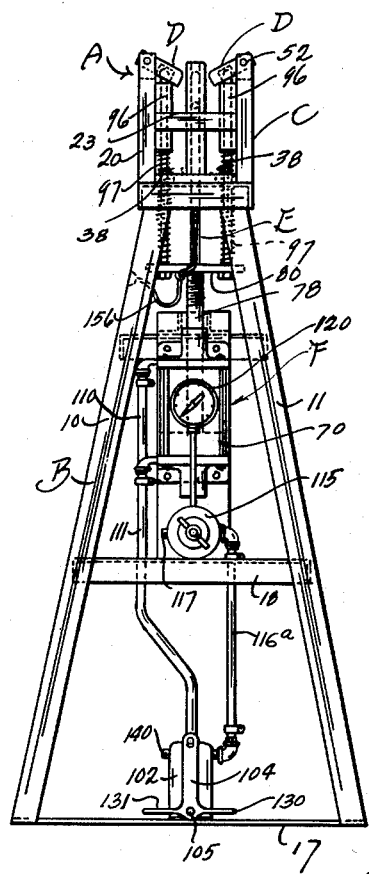
Fig. 2 is a front view of the machine, with the skirt or the housing removed from the operator's position at the machine, showing associated details thereof.

The piston 77 may be hydraulically or pneumatically actuated. If desired the plate 80 may be actuated electrically or manually by means of a foot treadle. In the machine as shown in the drawings it is preferred to pneumatically actuate the piston. To that end the heads 71 are provided with upper and lower line connections 100 and 101. A valve mechanism 102 is provided upon the base 17 of the machine, preferably at the front thereof (valve body not shown) which may be actuated by a treadle 104, pivoted at 105 upon the casing of the valve structure. The upper cylinder connection 100 may have a line connection 110 to the valve 102 and the lower cylinder connection 101 may have a line 111 connected to the valve 102. A diaphragm type pressure regulating valve 115, having a manual control, may be mounted upon one of the cross bars 18 of the supporting frame. It has a source of power, such as a pump 116 connected thereto, at 117. The locus 117 is the inlet of air to the pressure regulating valve 115. Valve 115 has a line 116a connecting it with the valve 102, as will be noted from the drawings, and particularly from the diagrammatic view showing in Fig. 10. The pressure regulating valve 115 may have a gauge 120 connected therewith for determining the pressure entering the cylinder for actuating the piston, and thus enable control of the effectiveness of the vamp stretching and vamp clamping actions.

The treadle 104 has a right hand lever portion 130, which when pressed downwardly causes air to enter the bottom of the cylinder through the line 111, and forces the piston 77 upwardly. This in turn pushes the plate 80 upwardly for performing the stretching and vamp clamping actions above described. The stretching and clamping action upon the vamp may be maintained for the period of time desired until the proper shaping has been attained. The treadle 104 has a left hand lever 131, which when depressed causes the air from line 116ª to enter line 110 and push the piston 77 downwardly. Of course when the air is under compression in the cylinder, being admitted from one line, the other line will be opened to the atmosphere through the valve 102 via an outlet 140. Downward movement of the plate 80 during the unclamping action continues until the plate 80 engages the nuts 95 and opens the clamps to permit removal of the shaped upper or article K.

Figure 9:
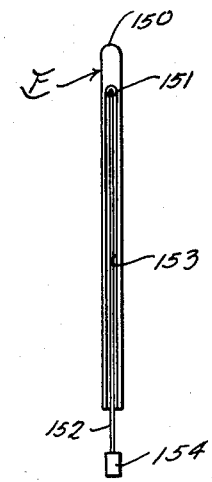
Fig. 9 is an edge view of the die of Fig. 8.
Figure 3:
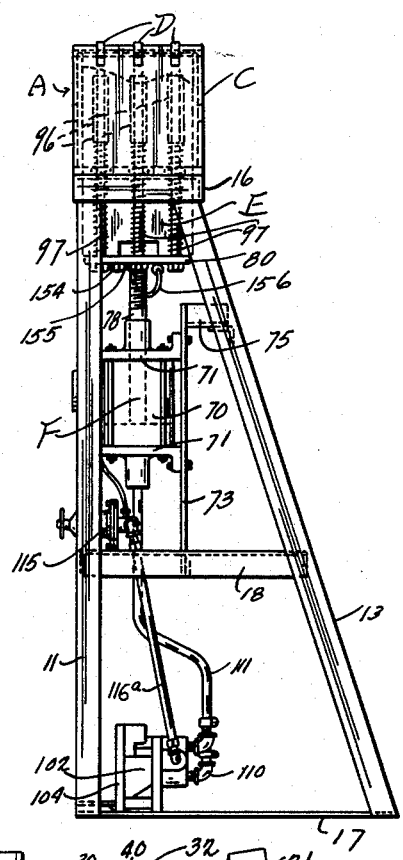
Fig. 3 is a right hand side elevation of the machine parts shown in Fig. 2.
Figure 4:
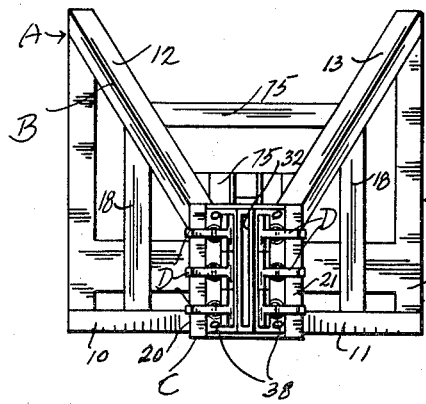
Fig. 4 is a plan view of the shaping machine shown in Fig. 2.

Referring to the die plate or shaping member E, the same is flat and has a molding surface 150 at the top margin thereof, which shapes the vamp or upper or other article K, as desired. A heating unit 151 is disposed in the upper portion of the shaping plate E, having an electrical conductor wire 152 leading therefrom disposed within a recess 153 in the edge of the plate E, as shown in Fig. 9. The wire 152 terminates in a plug 154, which may be movably plugged to a stationary socket 155, shown in Fig. 3. To the stationary socket 155 is connected a loose loop of wire 156, having sufficient slack therein to allow for reciprocatory movement of the plate 80. The central part of the plate E is opened at 160, for the purpose of preventing flow of heat downwardly through the die, and maintaining the heat where it is most effective, at the shaping edge 150.

The housing G comprises a tapered skirt which may fit over the entire frame B and preferably the lower part of the head C. It is recessed at 170 to permit the operator to actuate the treadle 104.

The parts of the entire machine are preferably of approved metal, and the die E is of steel. The die E, may be provided with steam outlet apertures along the shaping edge 150, and suitable means (not shown) for forcing steam against the work to be shaped.

Upward movement of the die plate E, may be stopped by the resistance of the material which is being shaped. The degree of such movement is also dependent on the amount of air pressure allowed to pass through the regulating valve 115.

Various changes in the size, shape and arrangement of parts of this invention may be made without departing from the spirit of the invention or scope of the claims.

I claim:

1. In a machine for the shaping of such articles going into the fabrication of shoes as vamps, the combination of a frame, a die shaping member movably carried by said frame, pivoted clamping members mounted upon the frame at opposite sides of said die, and means for simultaneously actuating the clamping members to clamp marginal portions of the article to be clamped at opposite sides of said die and for moving the die at the same time to stretch the article for shaping purposes.

2. A machine as described in claim 1, in which the clamping means at each side of the die comprises a plurality of clamping members which have individual pressure action upon the portions of the article which they clamp.

3. A machine as described in claim 2, in which the clamping action forcing the clamping members into clamping action with said article to be shaped comprises a yieldable compression spring.

4. A machine for the shaping of parts of a shoe such as a vamp comprising a supporting framework, a guided shaping die carried by the framework in movable relation thereon, clamping members pivoted upon said framework at each side of said die plate and movable to engage portions of the part to be shaped and compress the same against said framework whereby the die may shape the part.

5. A machine as described in claim 4, in which spring means is provided upon the framework, and means is provided for compressing the spring means to move said members into clamping operation.

6. In a shoe part shaping machine for use in the manufacture of shoes, the combination of a supporting frame, a shaping die movably carried by the frame, a plurality of pivoted clamping members carried by the frame at each side of said die having portions engageable against the frame for the clamping of parts to be shaped at opposite side of said die with the part to be shaped in straddling relation with respect to the die, rods pivotally connected with said clamping members, a compression spring upon each of said rods, tubular sleeves upon each of said rods between the respective clamping member and its spring, and means for simultaneously compressing said springs to move the tubular sleeves against said clamping members for clamping thereof upon the shoe part to be shaped.

7. A machine as described in claim 6, in which means is provided for simultaneously moving the die into shaping position with the part to be shaped and for moving said springs into compressed positions for urging the clamping members into clamping engagement with said part to be shaped.

8. In a shoe shaping machine for use in the manufacture of shoes and specifically for the purpose of shaping parts of shoes such as uppers having uneven thicknesses of parts, the combination of a supporting frame having a passageway therein, a die slidable in said passageway, the frame at opposite sides of the die and close to the die having side facing frame surfaces which extend in the same general planes as the plane of action of the die, clamping members movably carried on the frame at opposite sides of the die spaced from said side facing frame surfaces, and means mounted on the frame for simultaneously actuating the die for shaping purposes and for urging the clamping members into clamping action against the work for positive holding of the work against said side facing frame surfaces in order that the die can be moved into the work while it is immovably held against the frame by said clamping members.

9. In a machine for shaping flexible shoe vamps and other parts of shoes, the combination of a supporting frame, a movable shaping die carried by the frame, pivoted clamping members mounted on the frame at opposite sides of the die extending in angular relation with respect to the plane of action of the die, and means for simultaneously actuating the die and the clamping members whereby the clamping members may be moved to clamp portions of the work at opposite sides of the die upon said frame while the die is acting to shape the piece of work.

10. In a shoe shaping machine for use in the manufacture of shoes, and specifically for the shaping of parts of shoes such as uppers, the combination of a supporting frame having a passageway therethrough, a die slidably mounted in said passageway, means mounted on the frame to move said die along the passageway into extended and retracted shaping relation, the frame at opposite sides of the die and close thereto having substantially parallel side facing frame surfaces, the frame spaced from said side facing frame surfaces also having frame portions, clamping members movably carried by the last mentioned frame portions, and means mounted on the frame to actuate said clamping members for positively clamping the piece of work against said frame side facing surfaces and thus enable the die to shape the work while the work is positively held against the frame by said clamping members.

11. A shoe shaping machine as described in claim 10 in which said clamping members are movably carried on the frame so that they will frictionally engage against the piece of work under such circumstances that as the die extends the work the pull upon the latter will tend to increase the clamping action of the clamping members upon the work and against the side facing frame surfaces.

12. In a machine for shaping flexible shoe vamps and other parts of shoes, the combination of a supporting frame, a movable shaping die carried by the frame, clamping members movably mounted upon the frame at opposite sides of the die, and means for simultaneously actuating the die and the clamping members whereby the clamping members may be moved to clamp the portions of the work at opposite sides of the die against the frame while the die is acting to shape the piece of work, said clamping members being movably mounted so that as the die shapes the piece of work the pull upon the latter will urge the clamping members into tighter clamping action of the work upon the frame at opposite sides of the die.

References Cited in the file of this patent

UNITED STATES PATENTS

| | | |
|---|---|---|
| 363,055 | Fifield | May 17, 1887 |
| 2,056,987 | Steiner | Oct. 13, 1936 |
| 2,061,700 | Slines | Nov. 24, 1936 |
| 2,176,186 | Osgood | Oct. 17, 1939 |